(No Model.) 6 Sheets—Sheet 3.

H. D. MILLETT.
MACHINE FOR MAKING COILED SPRINGS.

No. 404,213. Patented May 28, 1889.

Witnesses.
Albert H. Adams.
Harry T. Jones.

Inventor
Humphrey D. Millett

(No Model.) 6 Sheets—Sheet 5.

H. D. MILLETT.
MACHINE FOR MAKING COILED SPRINGS.

No. 404,213. Patented May 28, 1889.

Witnesses
Albert H. Adams.
Harry T. Jones.

Inventor,
Humphrey & Millett

(No Model.) 6 Sheets—Sheet 6.

H. D. MILLETT.
MACHINE FOR MAKING COILED SPRINGS.

No. 404,213. Patented May 28, 1889.

Witnesses
Albert H. Adams
Harry T. Jones

Inventor,
Humphrey D. Millett

UNITED STATES PATENT OFFICE.

HUMPHRY D. MILLETT, OF MAYWOOD, ILLINOIS.

MACHINE FOR MAKING COILED SPRINGS.

SPECIFICATION forming part of Letters Patent No. 404,213, dated May 28, 1889.

Application filed October 22, 1888. Serial No. 288,816. (No model.)

*To all whom it may concern:*

Be it known that I, HUMPHRY D. MILLETT, residing at Maywood, in the county of Cook and State of Illinois, and a subject of the Queen of Great Britain, have invented a new and useful Improvement in Machines for Making Coiled Springs, of which the following is a specification, reference being had to the accompanying drawings, in which—

Fig. 3ª is a detail showing part of the devices for drawing off the springs from the mandrel. Fig. 8ª is a detail, being a plan of devices for operating the tongs. Fig. 10 is a detail, being a section at line 10 of Fig. 9, looking from the left. Figs. 11 and 11ª are, in fact, a single figure, being a detail of the coiling-shaft, shown in section. Fig. 12 is a detail showing a gear for driving the coiling-shaft and the worm which drives the devices for governing the pitch of the springs. Fig. 15ª is an elevation of the parts shown in Fig. 15. Figs. 1, 5, 9, 16, 17, 18, and 19 are on a scale of about one-half of an inch to the foot. The other figures are enlarged on different scales.

My invention is primarily designed to be used in manufacturing springs for cars. It is customary to make such springs from round rods, the ends of which are flattened before the spring is coiled, which flattening has required a separate heat, and the flattening has usually been done with hammers.

The leading object of my invention is to provide a machine by means of which the ends of the rod can be flattened and the rod be coiled into a spring at a single heat, the construction of the machine being such that while the ends of one rod are being flattened another rod, the ends of which have been previously flattened, will be coiled, all of which I accomplish as illustrated in the drawings, and hereinafter described. Those things which I claim as new will be pointed out in the claims.

In the drawings, 1 represents the main frame.

2 is a sliding frame, provided with slides 4, located upon the main frame.

5 is a roller.

Figure 18:
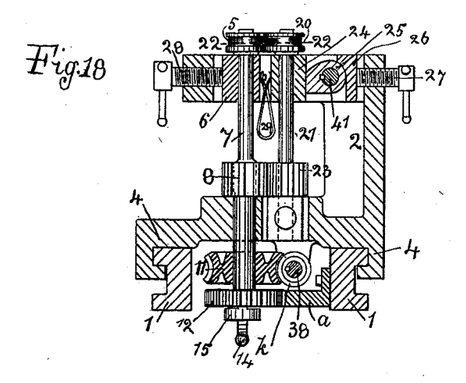
Fig. 18 is a detail, being a section taken at line 18 of Fig. 9, looking from the left.

6, Fig. 18, is an adjustable bearing for the shaft 7. 8 is a gear-wheel on this shaft 7. 11 is a worm-wheel on this shaft, which is driven by a worm, *k*, fastened onto the shaft 38 and held in place by bearings for this shaft 38, between which the worm *k* is located.

12 is a spur-wheel loose on the shaft 7.

Figures 19, 21:
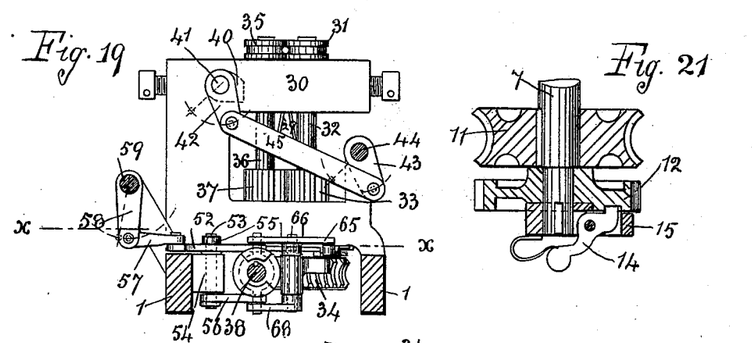
Fig. 19 is a section at line 19 of Fig. 1, looking from the right.
Fig. 21 is a detail showing the device for moving one pair of the rolls for tapering away from the other pair.

14 is a lever pivoted in a disk, 15, which is keyed on the shaft 7. (See Fig. 21.) The upper end of this lever engages with a notch on the under side of the wheel 12, and it is held in engagement therewith by a spring, and it is thrown out by contact with a stop located on the frame, which stop is to be adjusted as required for rods of different lengths, and the stop is to be so located that the movement of the sliding frame 2 will cease when the flattening or tapering of the rod is completed. This sliding frame is to be returned at the proper time to its normal position against a stop on the frame by means of a weight arranged to operate at the proper time by devices governed by the shaft 62, which devices are not shown in the drawings.

20 is another roll for tapering, used in connection with the roll 5. (See Fig. 18.)

21 is a shaft on which the roll 20 is located.

23 is a gear-wheel on the shaft 21, which can engage with the gear-wheel 8 on the shaft 7.

24 is a movable bearing for the shaft 21, which is supported at the lower end in a pivoted bearing.

25 is a dog, which slides on the shaft which carries it, being connected thereto by a feather.

26 is a block behind the dog 25.

27 and 28 are adjusting-screws, by means of which the block 26 and the bearing 6 can be adjusted.

29 is a spring which acts upon the bearing 24 to separate the rolls 20 and 5 when the dog 25 is out of the way.

30 is a fixed frame upon the main frame.

31 is a roller supported in the upper end in an adjustable bearing similar to the bearing 6 and on a shaft, 32. (See Fig. 19.)

33 is a gear-wheel on the shaft 32. 34 is a worm-wheel on the same shaft.

35 is another roller on the shaft 36, on which is a gear-wheel 37, which can engage with the gear-wheel 33.

Figure 22:
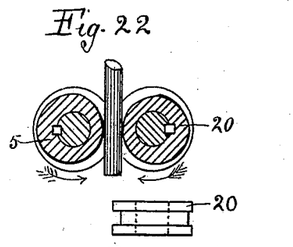
Fig. 22 is a section at line 22 of Fig. 18, showing the position of the parts before the bar has been tapered.
Figure 23:
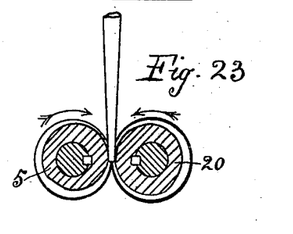
Fig. 23 is a view similar to that shown in 22, except that the parts are shown in the position they occupy after the bar has been tapered.

The acting parts of the four rolls are eccentrics. (See Figs. 22 and 23.)

38 is the main driving-shaft of this part of the machine, supported in suitable bearings.

Figure 20:
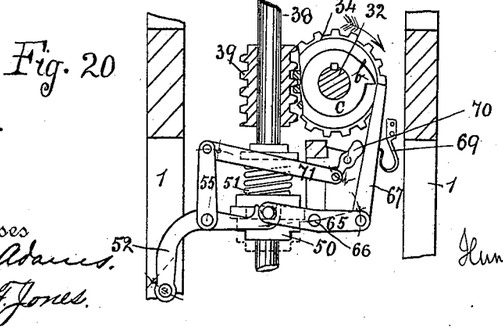
Fig. 20 is a detail of the mechanism for throwing the driving-shaft of the tapering or flattening devices in and out of gear, and is a section at line x of Fig. 19.

39 (see Fig. 20) is a worm keyed to the shaft 38, which worm engages with a wheel, 34.

40 (see Fig. 1) is a dog keyed onto the rock-shaft 41, the rocking of which shaft moves the dogs 25 and 40.

42 is a crank on the shaft 41.

43 is a crank on the rock-shaft 44, which shaft is supported in suitable bearings.

45 is a bar which connects the two cranks 42 and 43.

46 is an arm on the rock-shaft 44, (see Fig. 9,) on the lower end of which arm there is a roller.

47 is a double-faced cam which operates the arm 46, the cam acting on the roller.

48 (see Fig. 1) is a loose pulley on the shaft 38. It has a face-clutch, 49, with which a a sliding clutch, 50, engages.

51 is a spring acting on the clutch 50.

52 is a forked lever pivoted on a short shaft, 53, supported in a bearing, 54. (See Fig. 19.)

55 and 56 are two other levers on the shaft 53. The levers 52, 55, and 56 are all keyed onto the shaft 53. The fork of the lever 52 engages with a loose collar on the clutch 50. The other end of this lever 52 is pivoted to a bar, 57, which is pivoted to a crank, 58, on a rock-shaft, 59. (See Fig. 1.)

60 (see Fig. 9) is an arm on the shaft 59.

61 is a cam on the shaft 62, which shaft is supported in suitable bearings, and the cam 61 operates the arm 60 and through it the shaft 59. This shaft 62 is the governing-shaft and carries the cams which govern the principal automatic movements of the machine.

63 is an arm on the shaft 59.

64 is a spring acting on the arm 63 to return the shaft 59 after it has been rocked by the arm 60 and cam 61.

65 (see Figs. 1 and 19) is a lever pivoted on the shaft 66, one end of which lever is connected with a collar on the clutch 50. The other end is connected to the lever 67.

$b$ is a projection on a disk, $c$, keyed onto the shaft 32. (See Fig. 20.)

68 is a short lever keyed at one end to the shaft 66, and the other end is pivoted to a pin on the collar on the clutch 50.

69 is a spring which acts on the lever 67. (See Fig. 20.)

70 is a lever pivoted on a support, one end of which bears against the lever 67.

71 is a bar connecting one end of the lever 55 with one end of the lever 70.

72 (see Figs. 1 and 5) is a rod in the machine, which rod is ready to be operated upon and have its ends flattened.

73 is a plate to receive one end of the bar when it leaves the rolls 31 and 35. 74 is another plate beneath the rod 72.

75 is an inclined plate over which the rod 72, after it has been flattened, passes to the coiling part of the machine.

76 and 77 (see Fig. 5) are two bars secured to hangers 78, supported at their upper ends in any suitable manner. These bars 76 and 77 form a track for the rollers 79. (See Fig. 6.)

80 is a plate which supports the rollers 79. The lower end of this plate forms one jaw of the pair of tongs of which 81 is the movable jaw, which is pivoted to the plate 80.

82 is a plate pivoted to a projection at the upper end of the plate 80.

83 (see Fig. 5) is a slot, into which a projection, 84, (see Fig. 6,) on the jaw 81 enters.

Figures 5, 6, 7, 8:
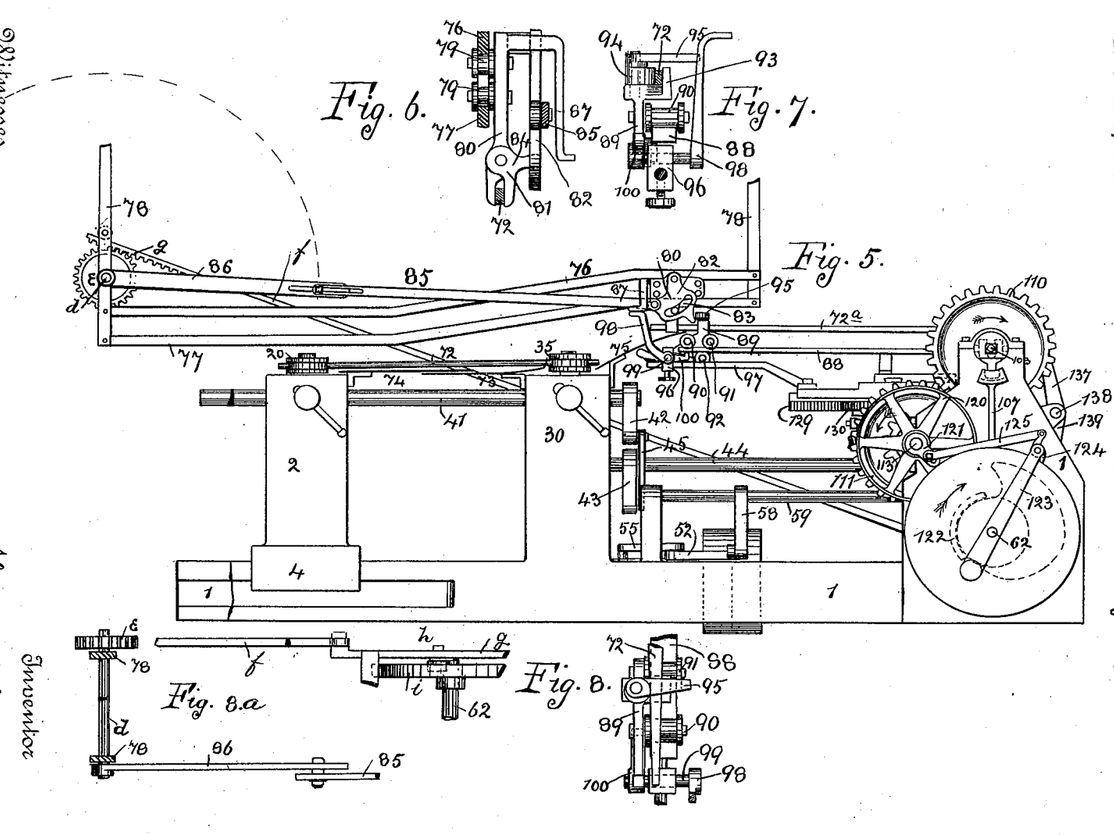
Fig. 5 is a side elevation.
Fig. 6 is a detail, being an elevation of the tongs, looking from the left of Fig. 5.
Fig. 7 is a detail, being an elevation of the carriage and stop, looking from the left of Fig. 5.
Fig. 8 is a plan of the parts shown in Fig. 7.

85 is a rod or bar, one end of which is pivoted to the plate 82, and the other end is pivotally connected with an arm, 86, which is keyed to a shaft, $d$, (see Figs. 5 and 8$^a$,) which is supported by hangers.

$e$ is a gear-wheel on one end of the shaft $d$.

$f$ is a rod or bar having a rack, $g$, at one end, which engages with the wheel $e$. The other end of this rod $f$ is pivoted to a slide which carries a roller, $h$, which engages a groove in the cam $i$ on the shaft 62.

87 is an arm secured to the plate 80.

88 is a track consisting of a single bar.

89 is a plate which carries three rolls, two of which, 90 and 91, are above and 92 is below the track 88. (See Fig. 5.)

Figure 14:
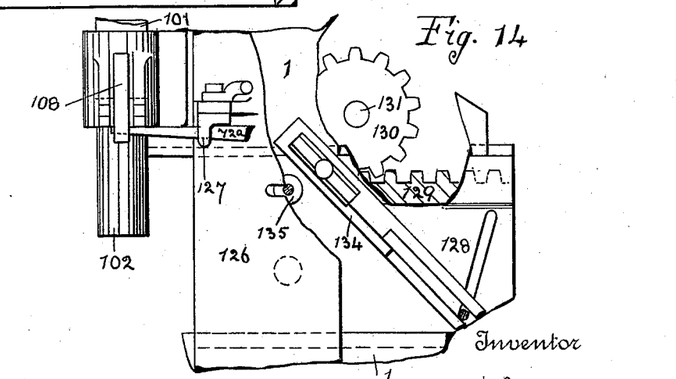
Fig. 14 is a detail, being an irregular section taken at about line 14 of Fig. 13, showing part of the sliding plates and devices for operating the same.

93 is an extension from the plate 89.
94 is an eccentric.
95 is a lever on the eccentric.
96 is a sliding stop on the rod 97 supported by the main frame.
98 is a lever pivoted to a pin, 99, in the sliding stop 96. (See Figs. 5 and 7.)
100 is a lock fast on the pin 99, which lock engages with the projection on the plate 89.
101 (see Figs. 1, 9, and 11) is a hollow coiling-shaft, which carries the mandrel 102, on which the spring is coiled.
103 is a rod in the shaft 101.
104 is a spring arranged to throw the rod 103 to the left.
105 is a lever pivoted to a collar on the shaft 101 to draw out the rod 103 and hold it out by engaging with a plate or collar on the end of this rod. (See Figs. 9 and 11$^a$.)
107 is a lever, one end of which engages with the lever 105 and the other end engages with a cam, 106.
108 is a clamp pivoted to the inner end of the rod 103. This clamp passes through the shaft 101, and its free end is arranged to clamp one end of a rod, 72$^a$, which rod is to be coiled, and this it does by means of projections 109, which move in slots in the projections on the shaft 101. (See Figs. 9, 10, and 11.)
110 is a gear-wheel on the shaft 101, which is driven by a gear-wheel, 111, on the sleeve 112, which is loose on a shaft, 113, which is a main driving-shaft. The wheel 111 has a face-clutch, 114.
115 is a sleeve on the shaft 113, which carries two clutches, one at each end, one of which engages with the face-clutch 114 and the other engages with a face-clutch on the gear-wheel 118 on the shaft 113, which wheel 118 engages with a gear-wheel, 119, which is keyed to the shaft 62.
120 is a driving-pulley on the shaft 113.
121 is a crank on the shaft 113, the throw of which is adjustable.
122 is a disk on the shaft 62.
123 is a lever pivoted on the shaft 62, the lower end of which lever is weighted.
124 is a pawl on the lever 122.
125 is a bar, one end of which is connected with a crank-pin of the crank 121, and the other end is connected with one end of the pawl 124. (See Figs. 5 and 9.)
126 is a sliding plate, (see Figs. 1 and 14,) which slides on guides on the frame. (See Fig. 10.) This plate carries a hook, 127, under which the rod which is to be coiled passes.
128 is another sliding plate at right angles to the plate 127. This plate has a rack, 129, on the under side, (see Fig. 5,) with which rack a gear-wheel, 130, engages, which wheel is driven by a face-clutch which slides on a feather on the shaft 131, which shaft is driven by a worm, 132, on the sleeve 112, which worm engages with a worm-wheel, 133, on the shaft 131.

Figures 1, 2, 3, 4:
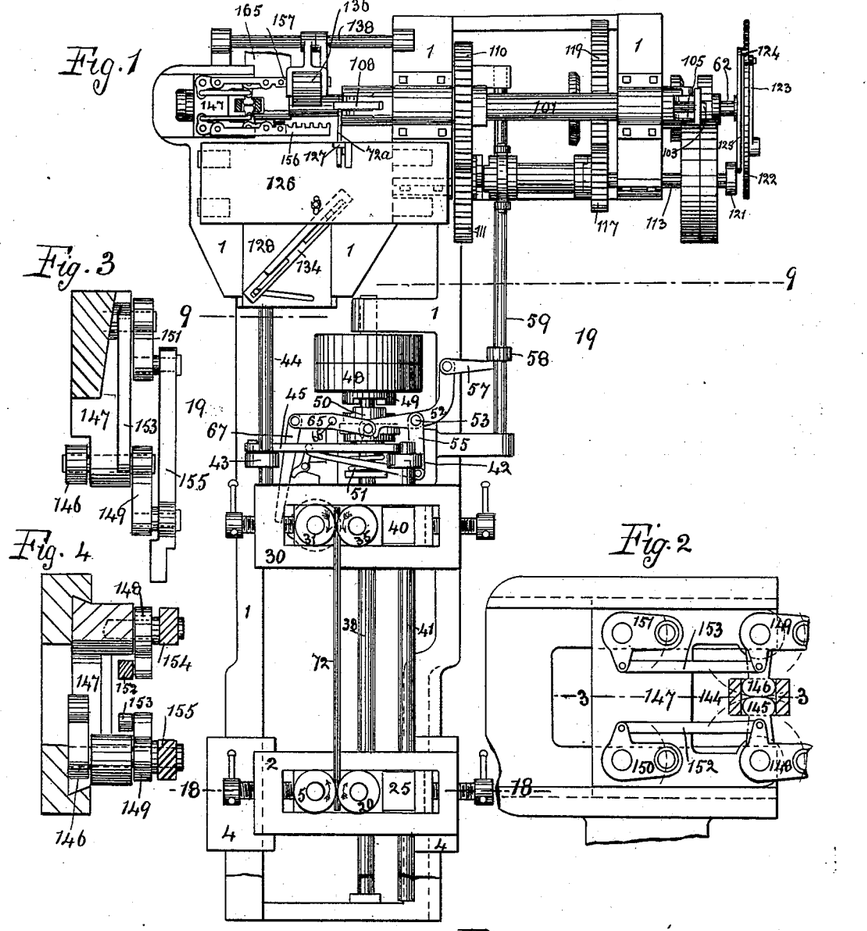
Figure 1 is a plan, the devices for feeding a bar or rod from the tapering devices to the coiling devices not being shown.
Fig. 2 is a detail showing a part of the devices for drawing off the coiled springs from the mandrel.
Fig. 3 is a section at line 3 of Fig. 2.
Fig. 4 is an end view of the parts shown in Fig. 2, looking to the left.
Figure 3A:
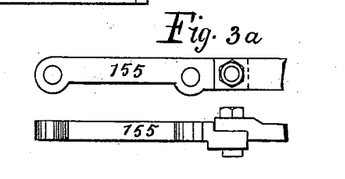
Figure 16:
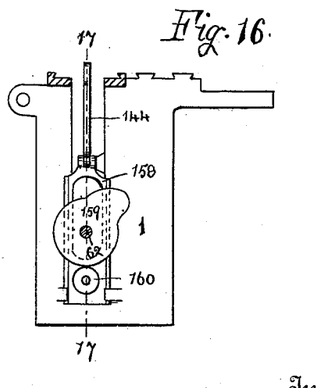
Fig. 16 is a detail, being a section at line 16 of Fig. 9.
Figure 17:
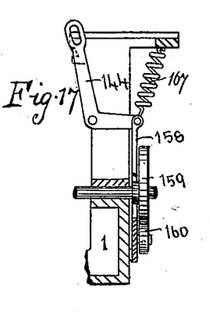
Fig. 17 is a section at line 17 of Fig. 16.

134 is a bar provided with two slots. It is secured to the plate 128 by bolts which pass through said slots, and one of said bolts passes through a slot in the plate 128, (see Figs. 1 and 14,) and this bar can be adjusted by means of the said bolts and slots. The bar is cut away on the upper side at one end.
135 is a roller secured to the under side of the sliding plate 126 by a bolt which passes through a slot, so that the roller can be adjusted. (See Figs. 1, 13, and 14.) When the plate 128 is moved inward, the edge of the bar 134 engages with the roller and carries the sliding plate 126 to the left.
136 is a pressure-roller supported by a lever, 137, which is on a rock-shaft, 138, under which pressure-roller the last end of the rod being coiled passes and is bent. This shaft 138 is rocked by a lever, 139, and cam 140 on the shaft 62.
$l$ is a weight on the lever 139.
141 is a bell-crank lever pivoted onto a projection from the frame, which lever throws the sliding plate 128 back to a normal position by the contact of the lever with a projection, 142, on the under side of the plate 128, the lever being operated by a cam, 143, on the shaft 62.
144 is a bell-crank lever pivoted to the frame. It is provided with a slot in its upper end. (See Figs. 2 and 17.)
145 and 146 are two levers, the free ends of which are in the slot in the lever 144, and these two levers 145 and 146 are fastened to pins on a sliding carriage, 147.
148 and 149 are two bell-crank levers fast on the pins which carry the levers 145 and 146. 150 and 151 are two other bell-crank levers, which are pivoted to the frame 147.
152 is a bar which connects the short ends of the levers 148 and 150, and 153 is another bar which connects the short ends of the levers 149 and 151. (See Figs. 2, 3, and 4.) The long arms of the levers 148 150 and 149 151 are provided with pins which project upward. A bar, 154, is pivoted on the pins on the two levers 148 and 150, and another bar, 155, is pivoted on the pins on the levers 149 and 151, which bars are not shown in Fig. 2 to prevent confusion. 154 is shown in Fig. 4. 155 is shown in Fig. 3 and in detail in Fig. 3$^a$.
156 is a metal bar provided with teeth on one side to engage the several coils of a spring which has been coiled on the mandrel. One end of this bar 156 is bolted to the bar 154. A similar bar, 157, is bolted to the bar 155.
The short arm of the lever 144 is pivoted to a slide, 158, which is operated by a cam, 159, on the shaft 62, which cam engages a roller, 160, on the slide 158. (See Figs. 16 and 17.)
161 (see Figs. 9 and 10) is a toothed clutch sliding on a feather on the shaft 131, which clutch can engage with the gear-wheel 130. This clutch 161 is moved by the double-faced cam 162 on the shaft 62, which cam operates a lever, 163, which rocks the shaft 164, to which the clutch-levers are keyed.

165 is an inclined plate, onto which the springs fall when drawn from the mandrel.

Figure 15:
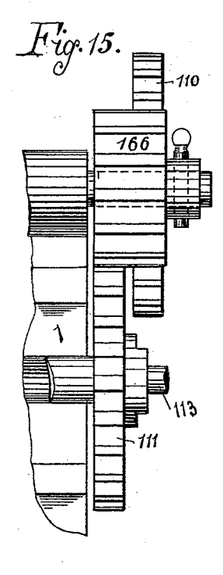
Fig. 15 is an elevation showing the arrangement of gear-wheels which may be used to drive the coiling-shaft in a machine for making right and left hand springs.
Figure 15A:
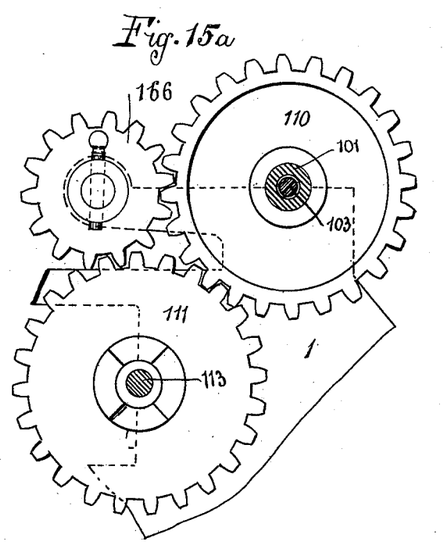

In Figs. 15 and 15ª I have shown driving-gear to drive a coiling-shaft in opposite directions to coil right and left hand springs.

166 is a gear-wheel on a shaft, which wheel and shaft are not shown elsewhere. To accomplish these results, the gear-wheel 110 is to be disengaged from the wheel 111, and wheel 166 is arranged to engage with both the gear-wheels 110 and 111. The wheel 166 becomes an intermediate wheel between the wheels 110 and 111, and by changing the position of the wheel 166 the direction of the movement of the wheel 110 on the shaft 101 can be reversed.

167 (see Fig. 17) is a spring, the action of which returns to their normal position the devices used for drawing the springs off from the mandrel.

Figure 9:
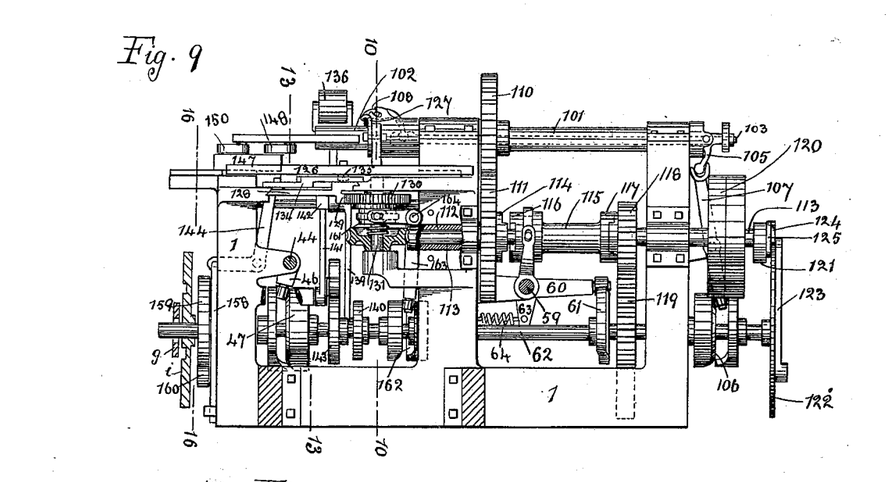
Fig. 9 is a section at line 9 of Fig. 1, some parts being shown in elevation.
Figures 10, 11, 11A, 12:
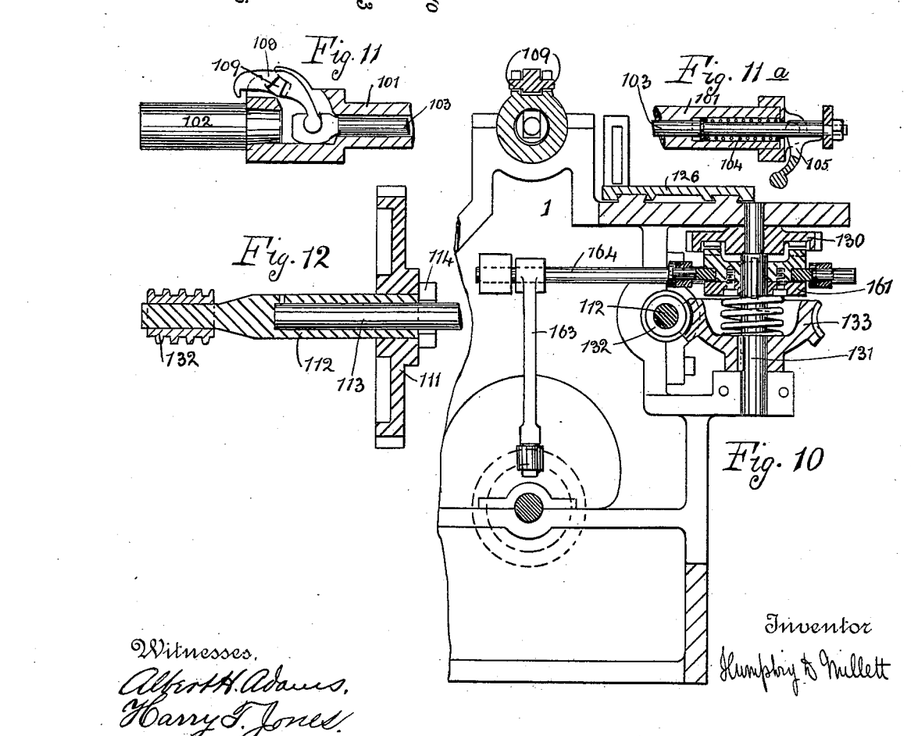
Figure 13:
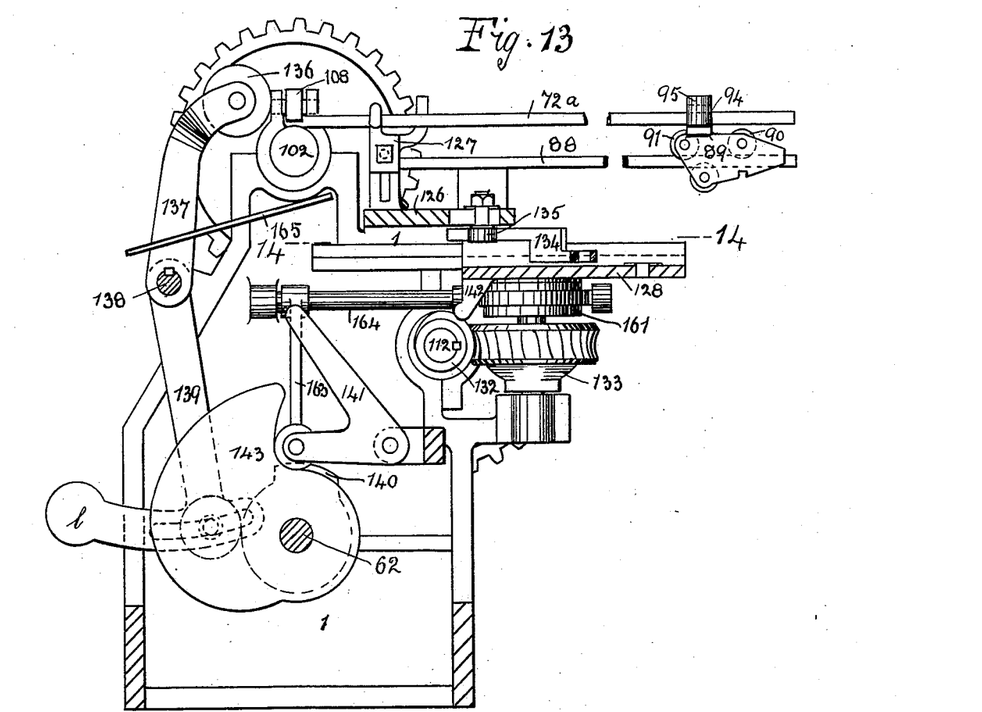
Fig. 13 is a section at line 13 of Fig. 9, looking from the left.

When the machine is in operation, the main driving-shaft 113 will be constantly in motion. When the clutch 117 is engaged with the face-clutch on the gear-wheel 118, (see Fig. 9,) the wheel 118 being engaged with the wheel 119 on the shaft 62, the cams thereon will be in operation, but the rolls for tapering the rods and the coiling devices will not be in operation. In Figs. 1 and 5 I have shown two rods—one, 72, ready to have its ends flattened, while the ends of the other rod, 72ª, have been flattened and it has been carried to the coiling part of the machine. The parts being as shown in Figs. 1, 5, and 9, the cam 61 will throw up the arm 60 on the shaft 59, which will rock the crank 58, and through the arm 57 the lever 52 will be moved, allowing the spring 51 to force the clutch 50 into engagement with the clutch 49 on the pulley 48, and the shaft 38 will then be rotated. The machine, then, will perform two operations at the same time. The rod 72 will be flattened at its ends and the rod 72ª will be coiled on the mandrel to form a spring. The first operation will be performed by the rolls for tapering, which will be rotated in opposite directions, the worms on the shaft 38 then engaging the worm-wheels on the shafts 7 and 32 and rotating the two rolls 5 and 31, while the rolls 20 and 35 will at the same time be rotated by the gear-wheels 8 and 23 and 37 and 33. (See Figs. 18 and 19.) At the same time the sliding carriage 2, which carries the rolls 5 and 20, will be moved a little away from the other rolls by the engagement of the lever 14 with the notch on the under side of the gear-wheel 12, which gear-wheel engages the rack a, (see Fig. 18,) and the ends of the rod 72 will be flattened by the rotation of the rolls. When the rolls have made a complete revolution, they will be thrown out of gear by the action of the projection b on the disk c, (see Fig. 20,) which then engages with the end of the lever 67, which operates the lever 65 and moves the clutch 50 out of gear with the driving-pulley 48. When the cam 61 is thrown up and the shaft 59 rocked, as stated, the rocking of the shaft 59 causes the clutch 116 to engage with the face-clutch 114 on the gear-wheel 111, and then through the gear-wheel 110 motion will be given to the coiling-shaft 101, and the bar 72ª then being under the hook 127 and its forward end being clamped to the mandrel 102 by the clamp 108, it will be coiled around the mandrel. At the same time the shaft 131 will be rotated by the worm 132 on the sleeve 112, and the clutch 161 then being engaged with the gear-wheel 130 will cause it to rotate, and it being in engagement with the rack 129 on the sliding plate 128, such plate will be moved inward and the bar 134 will act on the roller 135 and cause the sliding plate 126 to move to the left, carrying the rod along, thus giving the pitch to the spring. The roller 135 is to be so adjusted that it will not be acted upon by the bar 134 until the mandrel has made almost one revolution. The movement of the plate 126 ceases before the coiling is quite completed, so that the last coil has no pitch, because the bar 134 ceases to act on the roller 135. About this time the pressure-roller 136 will be brought to bear on the end of the rod 72ª and bend it, the same having passed from under the hook. This movement of the pressure-roller will be produced by means of the cam 140 acting on the lever 139 and rock-shaft 138, forcing the roller toward the mandrel. While the coiling has been going on the shaft 62 has been rotated a certain distance by the crank 121. The cam 61 not only brings the clutch 116 into engagement with the face-clutch 114, but holds it in such engagement while the spring is being coiled, which it does so long as its enlarged part engages with the frame 60. I provide for partially rotating the shaft 62 while the clutch 117 is disengaged from the wheel 118 by means of the pawl 124, the lever 123, the crank 121, and the connecting-bar 125, the pawl 124 being clamped against the edge of the disk 122, which is fast on the shaft 62 during a portion of each revolution of the shaft 113, which carries the crank 121. (See Fig. 5). When the spring has been fully coiled, the cam 61 will be in a position which allows the arm 60 to drop, and by the action of the spring 63 the clutch 116 will be released from the clutch 114, and clutch 117 will engage with the clutch on the wheel 118. At the same time the clamp 108 will be released from the coiled spring on the mandrel by the cam 106, lever 107, and lever 105, allowing the spring 104 to move the rod 103. At the same time the clutch 161 will be disengaged from the wheel 130 by the cam 162, lever 163, and shaft 164. (See Fig. 10.) Then the lever 141 will be operated by the cam 143, and the long arm of such lever will be brought into engagement with a projection, 142, on the plate 128, and it will be returned to its normal position, (see Fig. 13,) and at the same time the sliding plate 126 will be thrown back by a weight, which is not shown. Immediately after the clamp 108 is released the pressure-roller 136 will also be released by a counter-balance, $l$, on the lower end of the lever 139, and the coiled spring will be drawn from the mandrel by the devices shown in Figs. 1, 2, 3, and 3ª and 4, which will then be operated by the cam and devices shown in Figs. 16 and 17, which devices will be returned to their normal position by the action of the spring 167. When the coiling-shaft is out of gear, the forked lever 52, the bar 55, the bar 71, and the levers 70 and 76 will come into the positions shown in Fig. 20, and then the tapering rolls 20 and 35 will be thrown back a little by the spring 29, the dogs 25 and 40 having been thrown down by the action of the cam 47 on the shaft 62, the cam rocking the shaft 44, and the shaft 41, which carries the said dogs, being at the same time rocked through the cranks 43 and 42 and connecting-bar 45. When the rollers 20 and 35 have been so moved back, the tongs will have been brought back over the rear end of the flattened bar 72, the jaws being on opposite sides and being open, and the plate 82 being partially rotated by the pull of the rod or bar 85. The jaws of the tongs will then be closed on the rod 72 and the carriage 80 will be moved forward, carrying the rod 72 up the incline 75 to the position of the rod 72ª, (see Fig. 5,) and then the tongs will be released by the contact of a projection on the plate 82 with the lever 95 on the carriage 89, the carriage being then held in place, being locked by the action of the arm 87 on the lever 98. The same contact of the projection on the plate 82 with the lever 95 will clamp the rod 72ª in the carriage 89 between the jaw 93 and the eccentric 94. At the same time the forward end of the rod 72ª will be clamped by the clamp 108, which will be operated by the rod 103. The sliding frame 2 having been returned to its normal position by a weight, as before stated, another rod, 72, is then to be fed to the rolls for tapering, which will then be closed by the dogs 25 and 40 on the shaft 41, operated by cams and connections, as before stated. At this time the cam 162 will throw the clutch 161 into engagement with the gear-wheel 130, and the governing-shaft having made a complete revolution, the parts will again be in the position shown in Figs. 1, 5, and 9, ready to again operate the tapering-rolls and the coiling devices.

What I claim as new, and desire to secure by Letters Patent, is as follows:

1. The combination of two pairs of rolls—such as 5 31 and 20 35—for flattening or tapering the ends of rods or bars, a pair of tongs, a carriage carrying the tongs, a track for the carriage, and a mandrel for coiling a spring, substantially as and for the purposes specified.

2. The combination of a coiling-mandrel, a hollow shaft, as 101, a sliding rod, as 103, a clamp, as 108, a lever, as 105, and a spring, 104, substantially as and for the purposes specified.

3. The combination of a coiling-mandrel, a hollow shaft, as 101, a sliding rod, as 103, a clamp, as 108, a lever, as 105, a spring, 104, a cam, as 106, a lever, as 107, and a collar or plate on the end of the rod 103, substantially as and for the purposes specified.

4. The combination of the sliding plates, as 126 and 128, a roller, 135, secured to the plate 126, an adjustable bar, 134, a rack, as 129, and a gear-wheel, as 130, substantially as and for the purposes specified.

5. The combination of a coiling-mandrel on a shaft carrying a gear-wheel, as 110, a driving-shaft, as 113, a sleeve, as 115, having a clutch at each end, gear-wheels 118 and 119, a shaft, as 62, cams, as 61 and 162, lever 163, shaft 164, shaft 59, a clutch-lever thereon, arm 60, gear-wheel 111, having a face-clutch, 114, sleeve 112, worm 132, gear-wheel 133, shaft 131, clutch 161, gear-wheel 130, rack 129, and sliding plates 126 and 128, substantially as and for the purposes specified.

6. The combination of a driving-shaft, 113, a cam-shaft, as 62, disk 122, crank 121, lever 123, pawl 124, and connecting-bar 125, substantially as and for the purposes specified.

7. The combination of a coiling-mandrel, a pressure-roller, 136, shaft 138, levers 137 and 139, and cam 140, substantially as and for the purposes specified.

8. In a machine for flattening the ends of a rod and at the same time coiling another rod or bar to make a spring, the combination of a main driving-shaft, rolls for flattening the end of a rod, tongs to carry forward the flattened rod, a coiling-mandrel, and a shaft, 62, carrying cams for automatically controlling the operations of the machine, substantially as specified.

9. The combination of a pair of rolls, as 5 and 31, a second pair of movable rolls, as 20 and 35, for flattening the ends of a rod, dogs, as 25 and 40, a shaft, 41, a crank, 42, a rod, 45, a crank, 43, a shaft, 44, a lever, 46, and cam 47, substantially as and for the purposes specified.

10. The combination of two rollers, as 31 and 35, with shafts, as 32 and 36, worm-wheel 34, worm 39, shaft 38, a clutch, as 50, a pulley, as 48, having a clutch, 49, a spring, as 51, a clutch-lever, 52, bar 57, crank 58, shaft 59, levers, as 52 and 55, a bar, as 71, levers 70 and 67, a spring, 69, and disk $c$, having a projection, $b$, and a lever, 65, substantially as and for the purposes specified.

11. A pair of rolls, as 31 and 35, in a fixed frame, in combination with another pair of rolls, as 5 and 20, in a sliding frame, substantially as and for the purposes specified.

12. A pair of rolls, as 31 and 35, in a fixed frame, in combination with another pair of rolls, as 5 and 20, in a sliding frame, a rotating shaft, as 7, a gear-wheel, as 12, and a rack, $a$, substantially as and for the purposes specified.

13. A pair of rolls, as 31 and 35, in a fixed frame, in combination with another pair of rolls, as 5 and 20, in a sliding frame, two shafts, as 7 and 21, two gear-wheels, as 8 and 23, worm-wheel 11, and the worm $k$, sliding on a shaft, as 38, substantially as and for the purposes specified.

14. A coiling-mandrel, in combination with two toothed bars, as 156 and 157, bolted, respectively, to bars, as 154 and 155, bell-crank levers, as 148 and 149 150 151, connecting-bars 152 153, levers 145 and 146, keyed to pins secured to a slide, 147, which carry the levers 148 and 149, a bell-crank lever, as 144, a slide, 158, and cam 159 on a shaft, as 62, substantially as and for the purposes specified.

15. The combination of a sliding plate, as 126, hook 127, a sliding plate, as 128, a roller, 135, secured to the plate 126, an adjustable bar, 134, adjustably connected with the plate 128, a rack, as 129, a gear-wheel, as 130, and a coiling-mandrel, substantially as and for the purposes specified.

HUMPHRY D. MILLETT.

Witnesses:
ALBERT H. ADAMS,
HARRY T. JONES.